(12) United States Patent
Hildebrandt

(10) Patent No.: US 10,427,268 B2
(45) Date of Patent: Oct. 1, 2019

(54) FINISHING DEVICE FOR FINISH MACHINING OF A WORKPIECE, IN PARTICULAR OF A CRANKSHAFT OR A CAMSHAFT

(71) Applicant: Supfina Grieshaber GmbH & Co. KG, Wolfach (DE)

(72) Inventor: Oliver Hildebrandt, Hornberg (DE)

(73) Assignee: SUPFINA GRIESHABER GMBH & CO. KG, Wolfach (DE)

( * ) Notice: Subject to any disclaimer, the term of this patent is extended or adjusted under 35 U.S.C. 154(b) by 0 days.

(21) Appl. No.: 15/501,448

(22) PCT Filed: Aug. 6, 2014

(86) PCT No.: PCT/EP2014/066945
§ 371 (c)(1),
(2) Date: Feb. 3, 2017

(87) PCT Pub. No.: WO2016/019997
PCT Pub. Date: Feb. 11, 2016

(65) Prior Publication Data
US 2017/0232570 A1    Aug. 17, 2017

(51) Int. Cl.
*B24B 1/00* (2006.01)
*B24B 5/42* (2006.01)
(Continued)

(52) U.S. Cl.
CPC ............ *B24B 5/42* (2013.01); *B23Q 11/0891* (2013.01); *B23Q 39/021* (2013.01);
(Continued)

(58) Field of Classification Search
CPC ......... B24B 5/42; B24B 19/125; B24B 49/06; B24B 21/008; B24B 49/03; B24B 49/02; B23Q 39/021; B23Q 39/028
(Continued)

(56) References Cited

U.S. PATENT DOCUMENTS 5,951,377 A * 9/1999 Vaughn .................... B24B 5/42
451/14
5,997,452 A * 12/1999 Assie ....................... B23B 5/18
409/200

(Continued)

FOREIGN PATENT DOCUMENTS

| DE | 102007026562 A1 | 12/2008 |
| DE | 102007059926 A1 | 6/2009 |
| GB | 2177329 A | 1/1987 |
| JP | 2000263398 A | 9/2000 |

*Primary Examiner* — Joseph J Hail
*Assistant Examiner* — Shantese L McDonald
(74) *Attorney, Agent, or Firm* — Leydig, Voit & Mayer, Ltd.

(57) ABSTRACT

A finishing device for finish machining of a workpiece, in particular of a crankshaft or a camshaft, comprising a workpiece holder and a rotary drive for rotating the workpiece about the workpiece axis thereof, comprising at least one first finishing tool for machining a main bearing concentric to the workpiece axis and at least one second finishing tool for machining an additional bearing, wherein the finishing tools can be moved along a transport axis which extends via a working area defined by the workpiece holder so that the finishing tools can be moved into an additional area arranged outside the working area.

15 Claims, 8 Drawing Sheets

(51) Int. Cl.
  *B24B 19/12*  (2006.01)
  *B24B 21/00*  (2006.01)
  *B24B 27/00*  (2006.01)
  *B24B 49/06*  (2006.01)
  *B23Q 39/02*  (2006.01)
  *B23Q 11/08*  (2006.01)

(52) U.S. Cl.
  CPC .......... *B23Q 39/028* (2013.01); *B24B 19/125* (2013.01); *B24B 21/008* (2013.01); *B24B 27/0023* (2013.01); *B24B 49/06* (2013.01)

(58) Field of Classification Search
  USPC ........................ 451/49, 14, 17, 303, 307, 311
  See application file for complete search history.

(56) References Cited

U.S. PATENT DOCUMENTS

| | | | |
|---|---|---|---|
| 2007/0178808 A1* | 8/2007 | Himmelsbach | B24B 19/12 451/11 |
| 2009/0142997 A1 | 6/2009 | Nagel et al. | |
| 2010/0054887 A1 | 3/2010 | Chen | |
| 2010/0173565 A1 | 7/2010 | Junker | |
| 2011/0158775 A1* | 6/2011 | Ando | B23B 3/36 414/222.07 |
| 2014/0178144 A1* | 6/2014 | Nakano | B23Q 1/017 409/219 |
| 2015/0298274 A1* | 10/2015 | Ayestaran Lazcano | B23Q 39/028 29/888.09 |

* cited by examiner

FINISHING DEVICE FOR FINISH MACHINING OF A WORKPIECE, IN PARTICULAR OF A CRANKSHAFT OR A CAMSHAFT

CROSS-REFERENCE TO RELATED APPLICATIONS

This application is a U.S. national stage application under 35 U.S.C. § 371 of International Application No. PCT/EP2014/066945, filed on Aug. 6, 2014. The International Application was published in German on Feb. 11, 2016, as WO 2016/019997 A1 under PCT Article 21(2).

FIELD

The invention relates to a finishing device for finish machining of a workpiece, in particular of a crankshaft or a camshaft.

BACKGROUND

Such a finishing device is known from DE 10 2007 059 926 A1. These finishing devices serve to provide bearing surfaces with a cross-hatched structure characteristic of a finishing process. For this purpose, a finishing tool, for example a finishing tape or a finishing stone, is pressed against a workpiece surface to be finish machined. In the process, an oscillation movement is superimposed onto the rotary movement of the workpiece, which is aligned parallel to the axis of rotation of the workpiece.

The finish machining of a workpiece produces a workpiece with minimal surface tolerances. This is conditional upon the finishing tools being aligned precisely relative to the workpiece to be machined. Additionally, in the case of crankshafts or camshafts with a plurality of bearings, the spacing of finishing tools, which are arranged parallel to one another as regarded in the axial direction of the workpiece, must be adjusted precisely relative to one another so that the finish machining of bearing surfaces, which are adjacent to one another, can be performed precisely according to the pitch of the crankshaft or camshaft.

The requirements described above require a precise alignment of the workpiece in the workpiece holder and a precise alignment of the finishing tools relative to the workpiece.

Moreover, the finishing tools are subject to wear such that they have to be replaced at regular intervals.

SUMMARY

An aspect of the invention provides a finishing device for finish machining a workpiece, the device comprising: a first workpiece holder; a rotary drive configured to rotate the workpiece about a workpiece axis; a first finishing tool configured to machine a main bearing concentric to the workpiece axis; and a second finishing tool configured to machine an additional bearing, wherein the finishing tools can be moved along a transport axis which extends via a working area defined by the first workpiece holder so that the finishing tools can be moved into an additional area arranged outside the working area.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The processes described above require the best possible access to the finishing tools, which is not always the case with the known finishing devices. For example, workpiece transport systems and/or spray prevention devices hamper free access to the finishing tools. This results in maintenance and/or adjustment works being hampered.

On this basis, an aspect of the present invention is to provide a finishing device with which the disadvantages described above can be prevented.

An aspect of the invention relates to a finishing device for finish machining of a workpiece, in particular of a crankshaft or a camshaft, comprising a workpiece holder and a rotary drive for rotating the workpiece about the workpiece axis thereof, comprising at least one first finishing tool for machining a main bearing concentric to the workpiece axis and at least one second finishing tool for machining an additional bearing.

An aspect of the invention is achieved by a finishing device of the type mentioned at the outset in that the finishing tools can be moved along a transport axis which extends via a working area defined by the workpiece holder so that the finishing tools can be moved into an additional area arranged outside the working area.

According to an aspect of the invention, it is provided for the accessibility of the finishing tools to be simplified in that they can be positioned outside of a working area in an additional area so that the finishing tools positioned there are particularly easily accessible. This simplifies the performance of maintenance works on the finishing tools.

It is feasible to mount the workpiece holder of the working area such that it can be conveyed out of the working area into the additional area and back. It is most preferable, however, that an additional workpiece holder is arranged in the additional area. This allows the working situation present in the working area for a specific tool to be replicated in the additional area such that setup procedures can be performed in the additional area. For example, the finishing tools can be adjusted in the additional area with respect to their spacing relative to one another and/or with respect to their position relative to a workpiece to be machined and then moved into the working area. The adjustment works performed in the easily accessible additional area must then no longer be performed in the poorly accessible working area.

It is most preferable for the additional workpiece holder to be structurally identical to the workpiece holder of the working area with respect to its workpiece holding surfaces (in particular conical tips) interacting with a workpiece.

It is most preferable for the additional workpiece holder to comprise a headstock and a tailstock such that a workpiece or a setup shaft can be arranged in the additional area and can be received there between the headstock and the tailstock of the additional workpiece holder.

In particular, it is preferable for a headstock and a tailstock of the workpiece holder of the working area to be aligned relative to one another and for the headstock and the tailstock of the additional workpiece holder to be aligned, or for it to be possible to align them, relative to one another in an identical manner. This simplifies the setup of the finishing tools.

For a particularly high working accuracy it is preferable for the headstock and the tailstock of the additional workpiece holder to deviate from having an alignment of their axes of rotation that is perfectly concentric and parallel to one another and to have the same offset and the same tilt relative to one another as the axes of rotation of the headstock and of the tailstock of the workpiece holder of the working area. This means that the positional and locational errors of the headstock and of the tailstock of the workpiece holder of the working area are transferred accurately to the headstock and to the tailstock of the additional workpiece holder and are replicated by it.

In order to determine a positional and locational error of the headstock and of the tailstock of the workpiece holder of the working area, it is possible to insert a smooth shaft ("setup shaft") between the headstock and the tailstock of the workpiece holder of the working area and to move a dial gauge over the surface of the smooth shaft, preferably within two different measurement planes, which in particular are perpendicular to one another.

In order to adjust the position and/or location of the headstock and/or of the tailstock of the additional workpiece holder, it is preferable if the position of the headstock and/or the tailstock can be adjusted along at least two, preferably three, adjusting axes that are perpendicular to one another.

In the process, for example, one of the adjusting axes corresponds to an axis of rotation of the headstock or of the tailstock respectively. Other adjusting axes allow an adjustment of the position of the headstock or of the tailstock respectively in a height and/or lateral direction.

In order to simplify the additional workpiece holder, it is advantageous if the headstock of the additional workpiece holder does not have any rotary drive. This is not necessary if no tool processing but rather simply maintenance and/or adjustment works are performed in the additional area.

In order to simplify the handling of the finishing tools, it is proposed that these are retained on a finishing tool holder, which is driven in a movable manner along the transport axis. The transport axis is structurally formed, for example, by a carriage guide, along which a carriage can be moved. This carriage is part of the finishing tool holder or forms the finishing tool holder. In particular, the transport axis is a straight line, as a result of which the transportation of the finishing tools is simplified.

The measures described above are particularly advantageous if a workpiece transport system is assigned to the working area of the finishing device. Such a workpiece transport system simplifies the feeding of unmachined workpieces and the transporting away of finish machined workpieces.

Furthermore, it is advantageous if a spray prevention device is assigned to the working area of the finishing device such that the areas outside of the working area, preferably including the additional area, are protected from coolant and/or lubricating fluid.

Particular advantages emerge if the finishing tools comprise finishing tapes or are constructed as such. Finishing tapes require comparatively complex handling to guide a finishing tape portion onto the workpiece, in the region of the contact with the workpiece and away from the workpiece to be machined. The finishing tape guides required to do this are particularly easily accessible for maintenance procedures in the case of the finishing device according to the invention.

The finishing device according to the invention is particularly suitable for machining crankshafts with main bearings and additional bearings in the form of big end bearings and for machining camshafts with main bearings and additional bearings in the form of cam circumferential surfaces.

The invention also relates to a method for setting up a finishing device described above, which is characterized in that a positional and locational error assigned to the workpiece holder of the working area is detected and in that the additional workpiece holder or parts thereof are positioned and/or aligned such that a positional and locational error assigned to the additional workpiece holder is identical to the positional and locational error of the workpiece holder of the working area.

A positional and locational error of a workpiece holder corresponds to a deviation from a perfectly concentric and parallel alignment of the central axes of a headstock and of a tailstock to one another of a workpiece relative to one another. The central axes of the workpiece holder of the working area are axes of rotation. The central axes of the additional workpiece holder of the additional area are axes of rotation or axes of retention fixed in the direction of rotation to retain a setup workpiece or a workpiece.

The invention also relates to a method for operating a finishing device described above, which is characterized in that the finishing tools are brought into the additional area, are aligned there, in particular by means of a setup workpiece (alternatively by means of a workpiece), are subsequently brought in their aligned state into the working area and are used there for finish machining of a workpiece.

Figure 1:
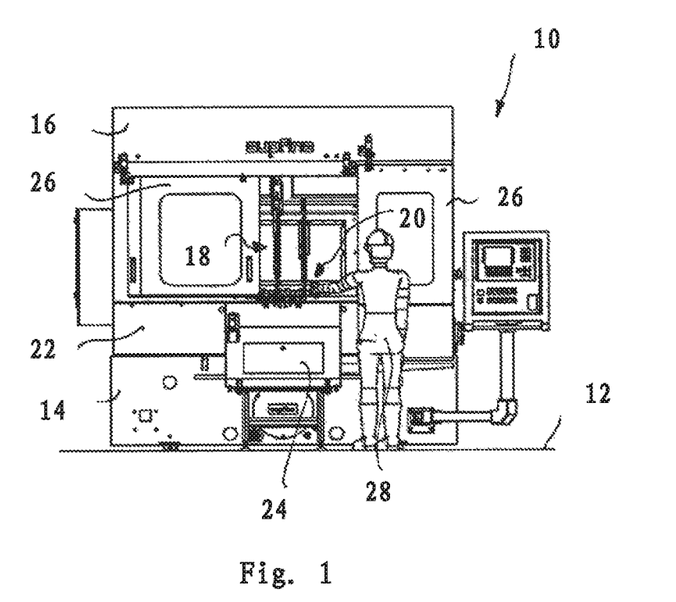
FIG. 1 is a front view of a finishing device known from prior art.
Figure 2:
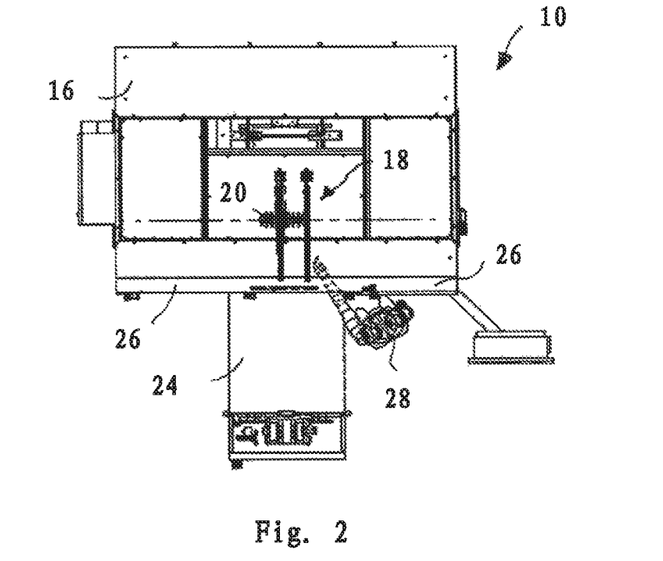
FIG. 2 is a plan view onto the finishing device according to FIG. 1.

A finishing device known from prior art is shown in FIGS. 1 and 2 and is denoted there altogether by the reference numeral 10. The finishing device 10 is constructed in the form of a machine tool, which is installed on an installation surface 12. The finishing device 10 comprises a base 14 and a protective hood 16 to limit an interior. A plurality of finishing tools 18 and a workpiece 20 are arranged in the interior of the machine tool.

The finishing device 10 comprises a spray guard 22 in the form of a housing wall and a workpiece transport system 24, with which workpieces 20 can be moved away from a front side of the finishing device 10 into the interior and transported away again out of the interior.

For access to the interior of the finishing device 10, sliding elements 26 are provided, which are part of the protective cover 16 and can be moved such that an access opening is formed on the front of the finishing device 10.

During the course of preparing the machining of a batch of workpieces, it is necessary to adjust the finishing tools 18 with respect to their position and alignment to the geometry of a workpiece 20. The setup procedures required to do so are hampered among other things by the spray guard 22 and the workpiece transport system 24. For an operator 28 it is particularly difficult to adjust finishing tools, which are concealed by neighboring finishing tools. In this connection, it is noted that the two finishing tools 18 shown by way of example in FIGS. 1 and 2 are normally part of a larger group of finishing tools. For example, a total of nine finishing tools, which are arranged closely adjacent to one another, are used for machining a crankshaft for an inline-four engine. In the process, five finishing tools serve to machine main bearings of the crankshaft and four finishing tools to machine big end bearings of the crankshaft.

Figure 3:
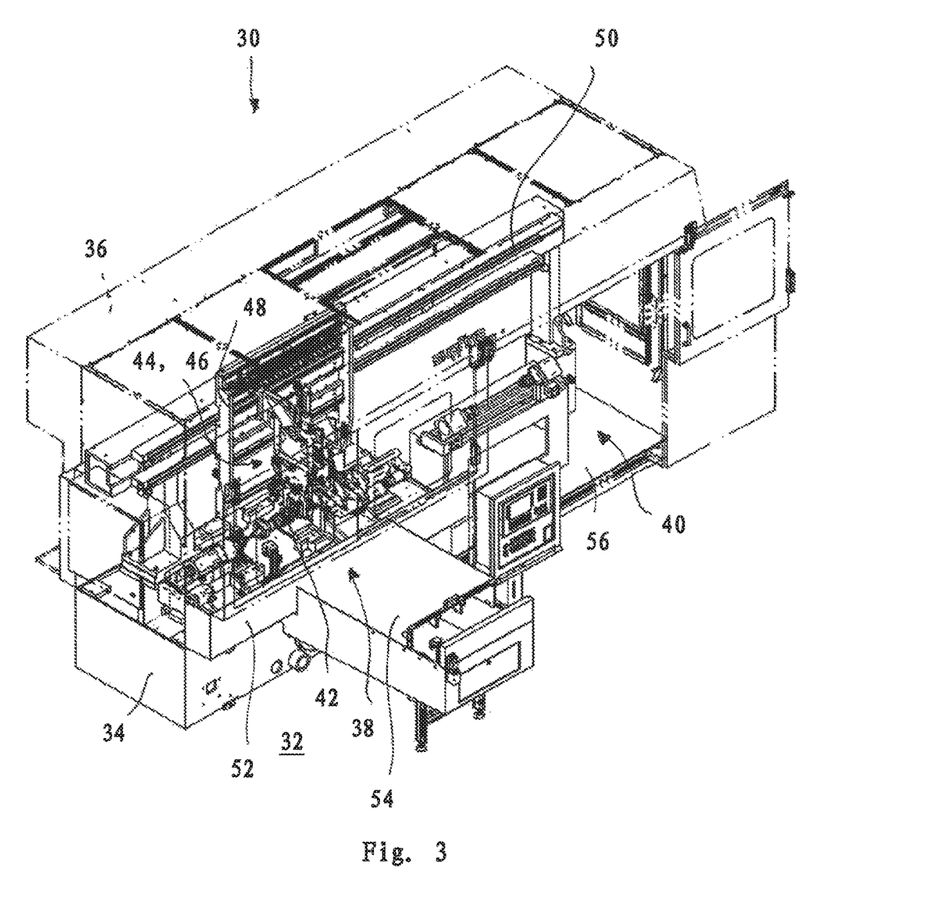
FIG. 3 is a perspective view of an embodiment of the finishing device according to the invention with finishing tools arranged in a working area.
Figure 4:
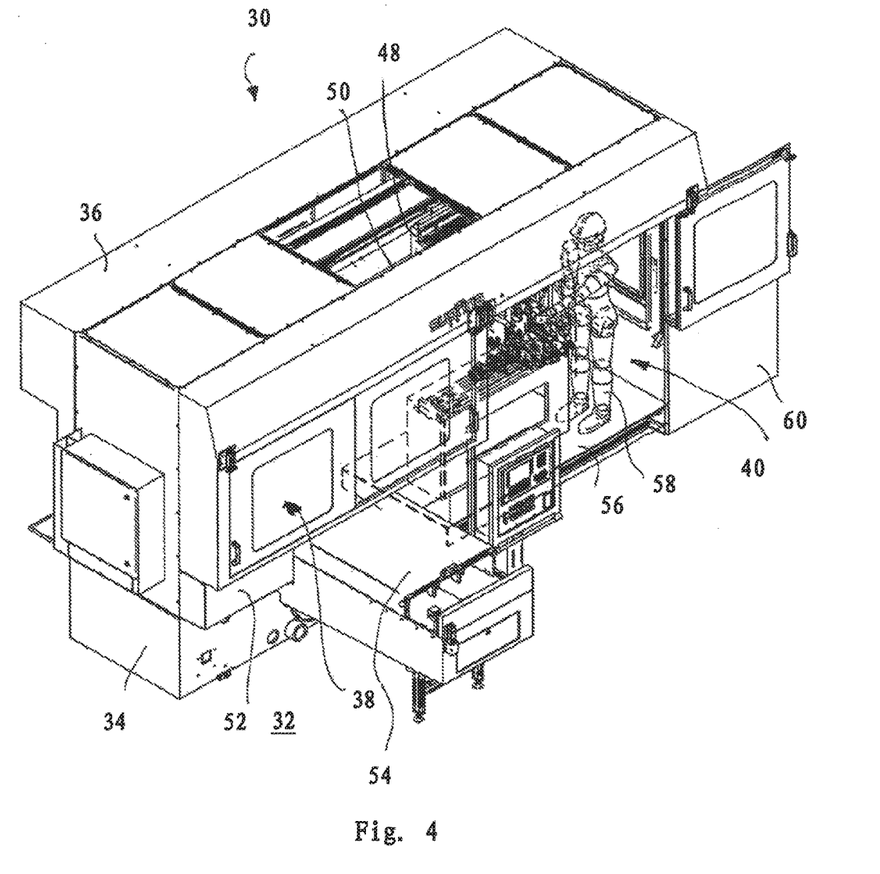
FIG. 4 is a view corresponding to FIG. 3, the finishing tools being arranged in an additional area.
Figure 5:
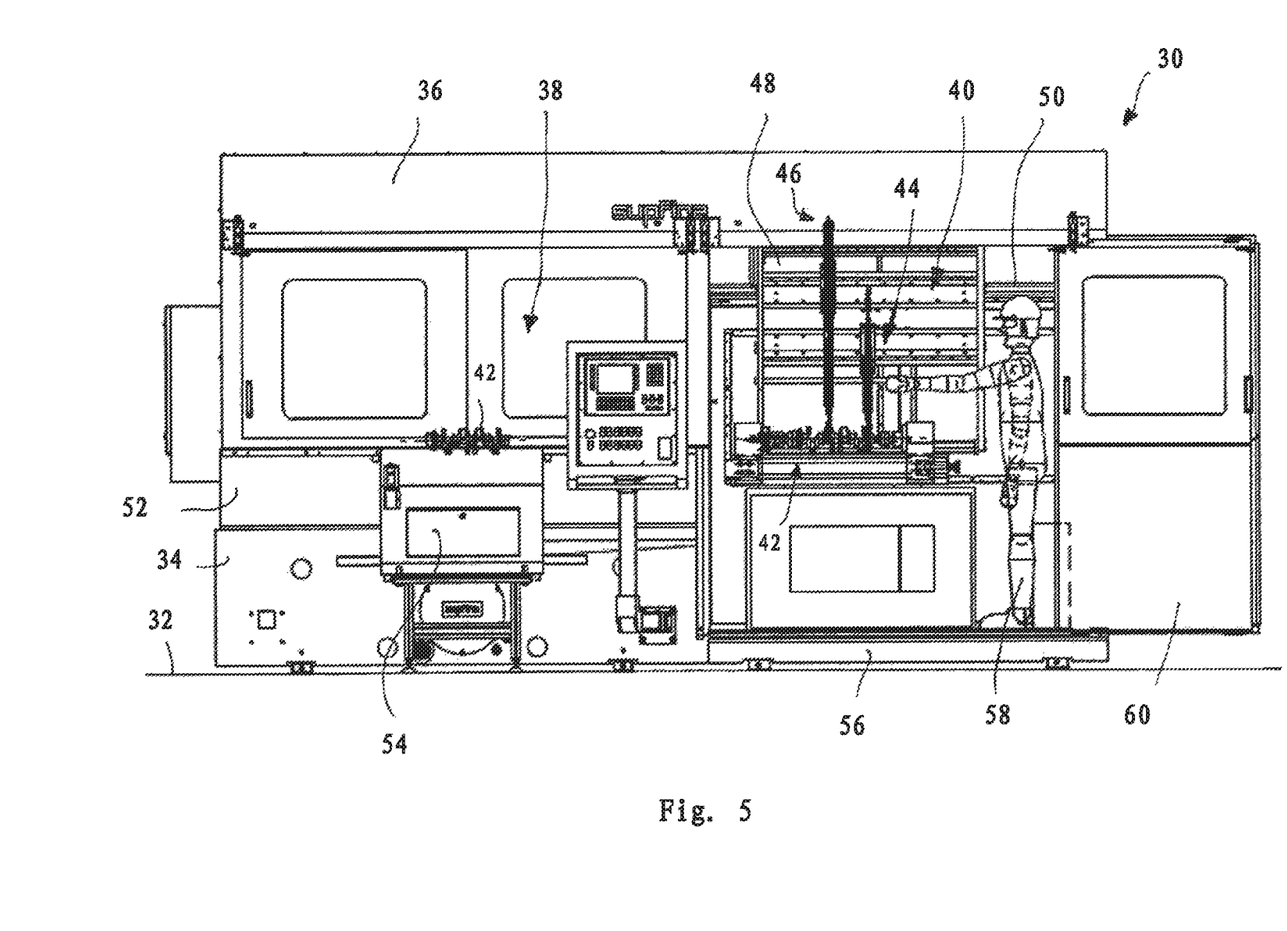
FIG. 5 is a front view of the finishing device according to FIGS. 3 and 4.

A finishing device according to the invention in the form of a machine tool is shown in FIGS. 3 to 5 and is denoted there altogether by the reference numeral 30. The finishing device 30 is installed on an installation surface 32 and comprises a base 34 and a protective hood 36 to limit an interior of the machine tool.

The interior of the finishing device 30 comprises a working area 38 and an additional area 40 arranged outside the working area 38. The working area 38 serves to finish machine a workpiece 42, in particular a crankshaft or camshaft. For this purpose, finishing tools 44, 46 are provided which are arranged adjacent to one another and machine workpiece surfaces of the workpiece 42 which are adjacent to one another. To improve clarity, only two finishing tools are shown in the drawing, namely a first finishing tool 44 for machining a main bearing of the workpiece 42 and a second finishing tool 46 for machining a big end bearing of the workpiece 42.

The finishing tools 44, 46 are each retained in a movable manner on a carriage 48, which in turn can be moved along a carriage guide 50. The carriage guide 50 proceeds in a straight line. The total length of the carriage guide 50 corresponds to the total of the respective individual lengths of the working area 38 and of the additional area 40.

The finishing device 30 has a spray guard 52 assigned to the working area 38 in the form of a wall, which is part of the protective hood 36. Furthermore, the finishing device 30 has a workpiece transport system 54, which protrudes forwards relative to the protective hood 36 starting from the working area 38 and therefore hampers access to the working area 38 of the finishing device 30, as does the spray guard 52.

The additional area 40 comprises a platform 56 arranged on the base with a tread for an operator 58.

Furthermore, at least one door 60 is assigned to the additional area 40, which door is preferably large enough for the operator 58 to enter into the additional area 40. For example, an opening that can be opened up by the door 60 has a minimum height of 1.60 m, preferably of 2 m. A minimum width of the opening that can be opened up by the door 60 is, for example 0.8 m, preferably 1.2 m.

Figure 6:
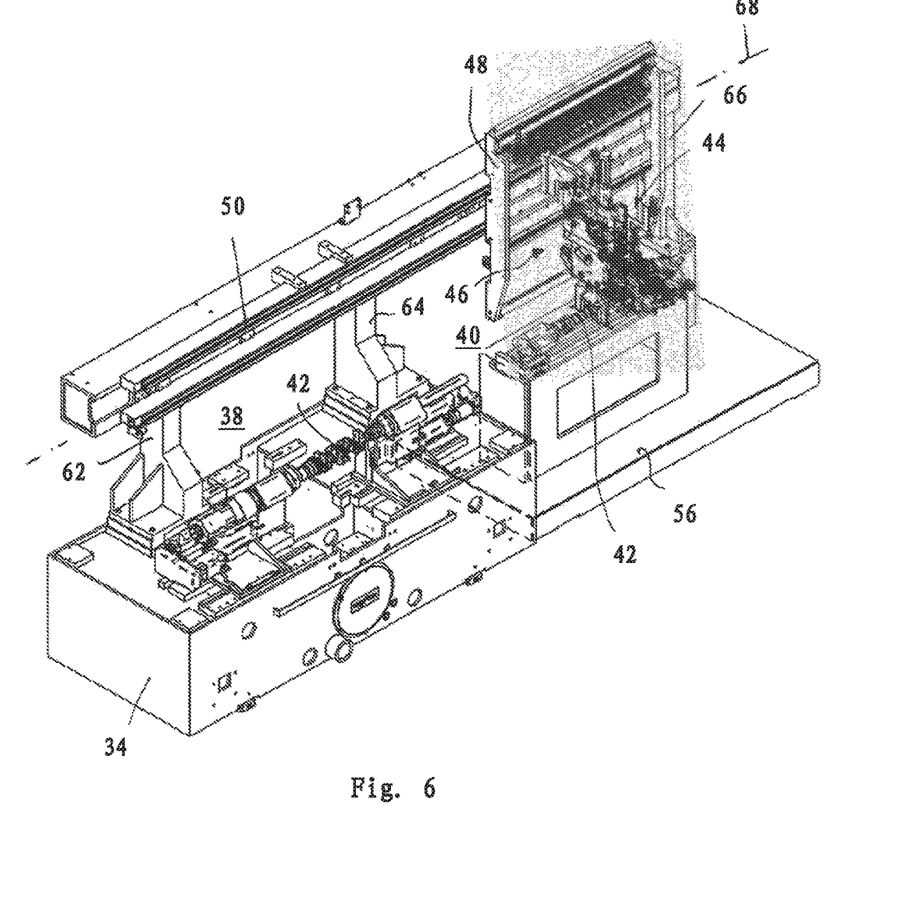
FIG. 6 is a perspective view of the finishing device according to FIGS. 3 and 4, without protective cover.

In order to set up and/or maintain the finishing tools 44, 46, the finishing tools are moved out of the working area 38 (cf. FIG. 3) into the additional area 40 (cf. FIGS. 4, 5 and 6).

For this purpose, a motor drive, which is not shown for reasons of clarity, is provided, which, for example, drives a spindle nut assigned to the carriage 48 via a threaded spindle and thus moves the carriage 48 along the carriage guide 50. The finishing tools 44, 46 can also be transported between the working area and the additional area 40 with the aid of pneumatic or hydraulic cylinders.

The carriage guide 50 is arranged in the upper region of the interior of the finishing device 30 and is, for example, supported on three support pillars 62, 64 and 66. Preferably, one pillar (62 and 66 respectively) is assigned to each of the areas 38 and 40, while a central pillar 64 is arranged in the transition area between the working area 38 and the additional area 40.

The carriage guide 50 defines a transport axis 68, along which the carriage 48 can be moved between the working area 38 and the additional area 40.

Figure 7:
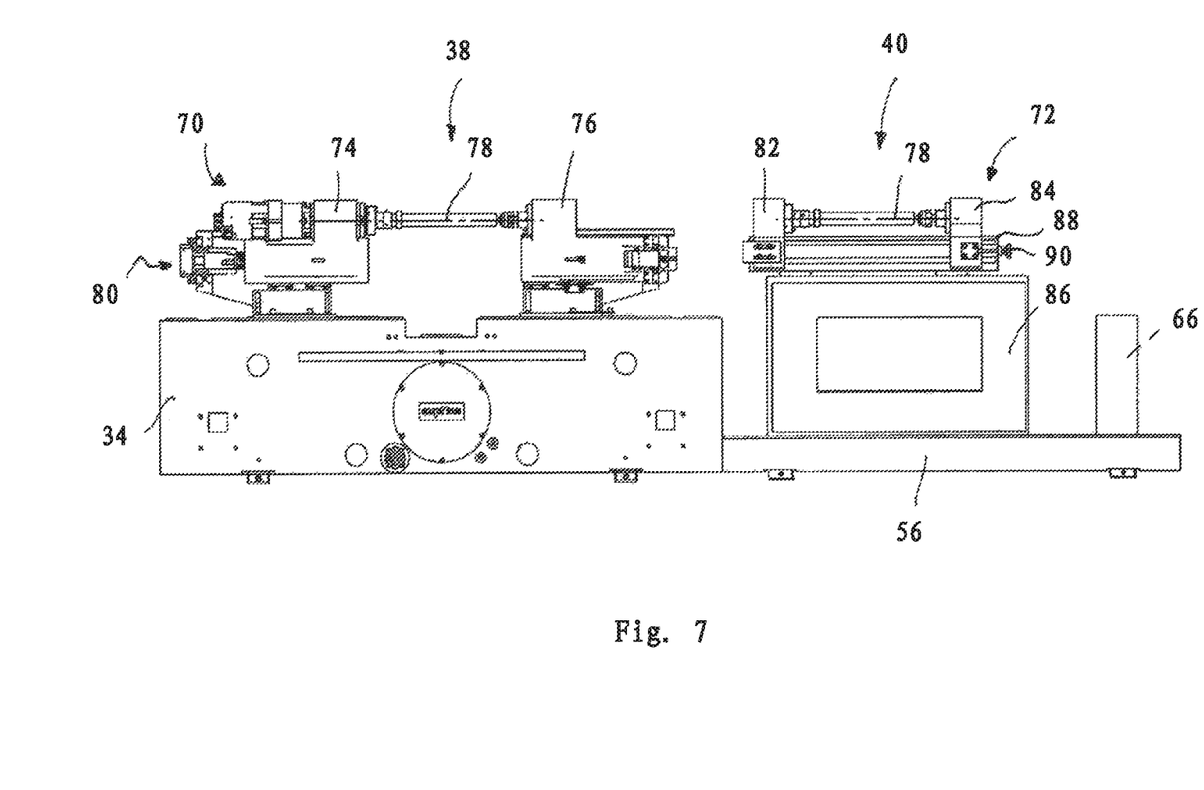
FIG. 7 is a front view of parts of the finishing device according to FIGS. 3 and 4, with a working area workpiece holder and with an additional area workpiece holder.
Figure 8:
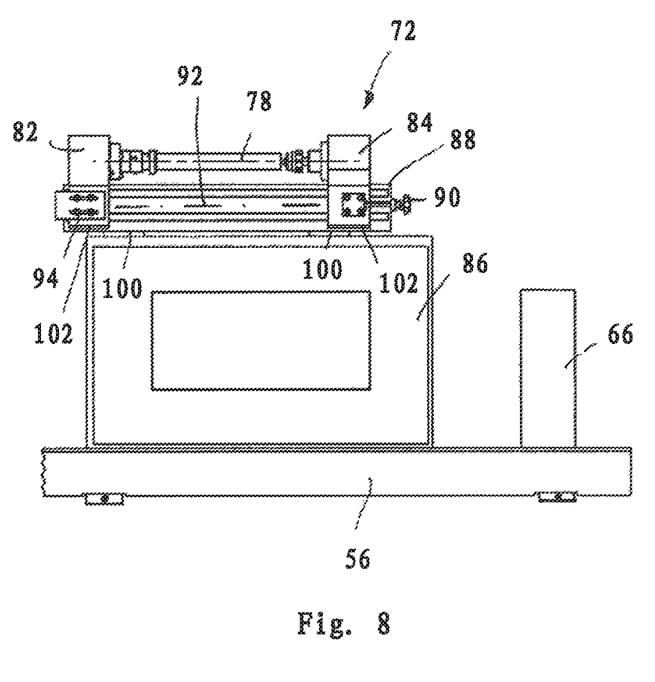
FIG. 8 is an enlarged front view of the additional area workpiece holder according to FIG. 7.
Figure 9:
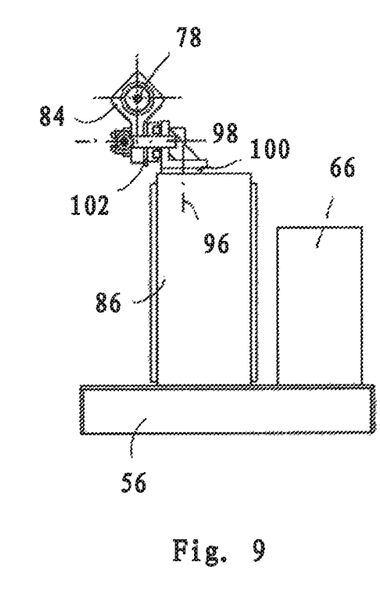
FIG. 9 is a side view of the additional area workpiece holder according to FIGS. 7 and 8.

Workpiece holders for holding a workpiece 42 are described below with reference to FIGS. 7 to 9. A workpiece holder 70 assigned to the working area comprises a headstock 74 acting as a rotary drive and a tailstock 76. During the finish machining of a workpiece 42, it rotates about a workpiece axis 78. This rotary movement is superimposed by an oscillating movement to and from. For this purpose, an oscillating drive 80 is provided, which moves a group comprising headstock 74, workpiece 42 and tailstock 76 to and from in a manner that is known per se in a direction parallel to the workpiece axis 78.

The workpiece holder 72 of the additional area 40 likewise has a headstock 82 and a tailstock 84, such that a setup shaft 104 (cf. FIG. 10) corresponding to the workpiece 42 can be arranged in the additional workpiece holder 72. Preferably, the headstock 82 of the additional workpiece holder 72 is constructed such that a setup shaft 104 accommodated between the headstock 82 and the tailstock 84 is rotatably mounted but cannot actively be driven in the direction of rotation. In a most preferred embodiment, the setup shaft 104 is only accommodated between the tips of the headstock 82 and of the tailstock 84 and is fixed in the direction of rotation in the process as well.

The additional workpiece holder 72 is mounted on a frame 86 such that when a workpiece 42 is arranged in the additional workpiece holder 72, a workpiece axis 78 of the workpiece 42 aligns at least substantially with a workpiece axis 78 of a workpiece 42 that is held on or in the workpiece holder 70 of the working area 38. In other words, the workpiece holder 72 of the additional area 40 replicates the workpiece holder surfaces of the workpiece holder 70 of the working area 38.

The headstock 82 and/or the tailstock 84 of the additional workpiece holder 72 can be moved parallel to the transport axis 68 of the finishing device 30 and held on a support rail 88. In order to move the tailstock 84 along an adjusting axis 92 parallel to the transport axis 68, a manual adjustment wheel 90 is provided. The headstock 82 is fastened to the holding rail 88 by means of a slotted screw connection 94 for the purpose of adjustment along the adjusting axis 92.

In order to position the headstock 82 and/or the tailstock 84 along a vertical adjusting axis 96 and/or along a horizontal adjusting axis 98, appropriate adjustment devices can be provided. In the simplest case, an adjustment is made along a vertical adjusting axis 96 by using a distance plate 100, which has been ground to size, and in a horizontal direction by using a ground distance plate 102 (cf. FIG. 9).

In order to set the position and location of the headstock 82 and/or of the tailstock 84 of the additional workpiece holder 72, a smooth, cylindrical alignment shaft (not shown in the drawing) is inserted into the workpiece holder 70 in the working area 38 between the tips of the headstock 74 and of the tailstock 76. Subsequently, a dial gauge is moved over the length of the alignment shaft, which is fixed in the direction of rotation, preferably within two measurement planes perpendicular to one another. A positional and locational error is determined in this manner. This positional and locational error is a deviation from an alignment of the axes of rotation of the headstock 74 and of the tailstock 76, which are perfectly concentric and parallel to one another, relative to one another.

Subsequently, the same alignment shaft is accommodated in the workpiece holder 72 of the additional area 40 between tips of the headstock 82 and of the tailstock 84 and a dial gauge is also moved over it as described above. The positional and locational error determined in this manner assigned to the additional area 40 is compared to the positional and locational error assigned to the working area 38.

Subsequently, the positions of the headstock 82 and/or of the tailstock 84 of the additional workpiece holder 72 are adjusted along the adjusting axes 92, 96 and/or 98 until the positional and locational error assigned to the additional area 40 matches the positional and locational error assigned to the working area 38.

A setup procedure is described by way of example below, and can be performed in the additional area 40, for preparing finish machining of a workpiece 42 in the working area 38.

Figure 10:
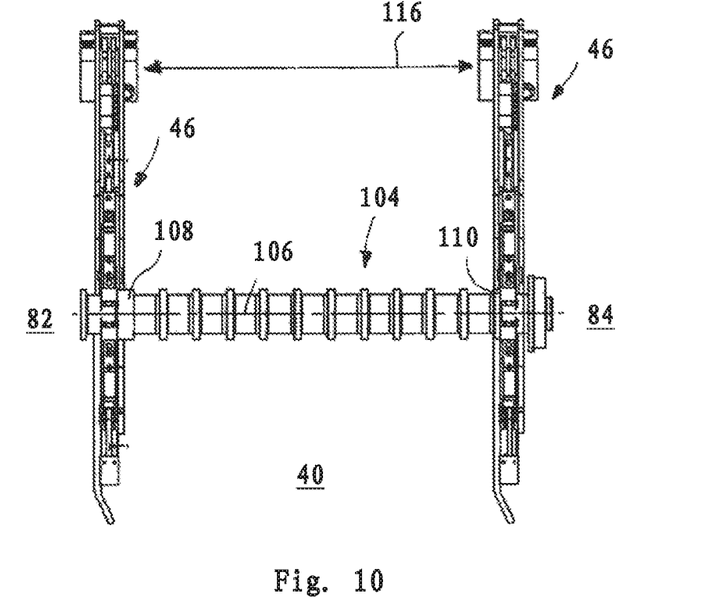
FIG. 10 is a plan view of an embodiment of a setup shaft for arranging in the additional area and for positioning of two finishing tools, which are shown by way of example, along a central axis of the setup shaft.
Figure 11:
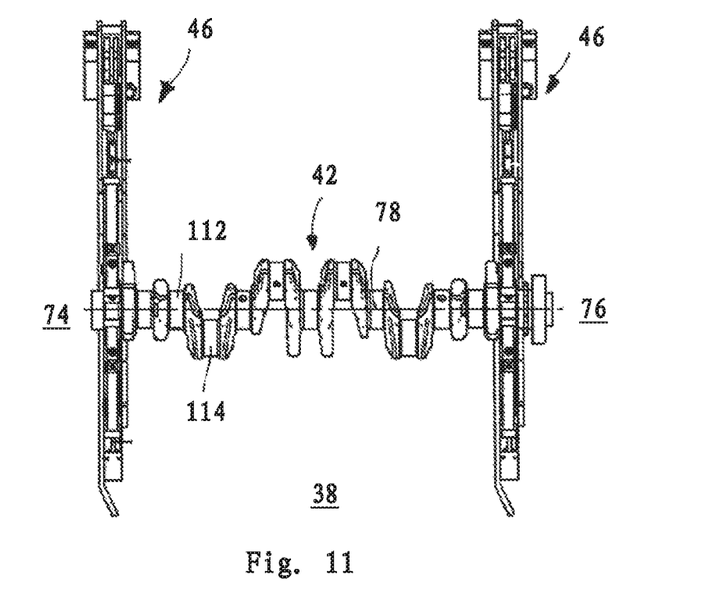
FIG. 11 is a plan view of an embodiment of a workpiece corresponding to the setup shaft for arranging in the working area, with finishing tools positioned along a central axis of the workpiece relative to one another according to FIG. 10.

In the additional area 40, a setup workpiece 104 can be positioned, and has a plurality of axial stops 108, 110 along its axis 106 (cf. FIG. 10). These axial stops 108, 110 are adjusted with respect to their spacing to corresponding spacing of surface portions to be machined of a workpiece 42 which is constructed in particular in the form of a crankshaft and comprises main bearings 112 and big end bearings 114 (cf. FIG. 11).

In the case of the embodiment shown in FIG. 10, two finishing tools 46, which are each constructed to machine a main bearing 112 of the workpiece 42, are positioned relative to one another in terms of their spacing 116. In the process, each finishing tool 46 is brought into contact with one of the stops 108, 110. Subsequently, the finishing tools 46 are fixed to the carriage 48 in the aligned state relative to one another in the axial direction. If the finishing tools 46 are subsequently moved out of the additional area 40 into the working area 38 by means of the carriage 48, the finishing tools 46 have a spacing relative to one another, which is already adjusted to the geometry of the workpiece 42 to be machined such that an alignment procedure no longer has to be carried out in this respect in the working area 38.

The setup shaft 104 preferably also serves to align the pressing bowls assigned to the finishing tools 44, 46, which press a finishing tape against a surface to be machined of the workpiece 42, relative to a pressing bowl carrier (in particular a pressing arm). For this purpose, it is preferable if an adjusting device is provided to fasten a pressing bowl to a pressing arm. For example, a screw fitting with adjustable incline for fastening a pressing bowl to a pressing arm is provided, this screw fitting with adjustable incline constituting the adjusting device. Such a screw fitting with adjustable incline preferably comprises rounded washers and bevel washers, the incline of which can be adjusted relative to one another such that the incline of an axis of a screw passing through the rounded washers and bevel washers can likewise be adjusted in order to define an incline of the pressing bowl relative to the pressing arm. In this manner, production and assembly errors in the entire system, which add up at the interface to the workpiece 42, can be compensated.

It is also feasible to use a workpiece 42 instead of a setup shaft 104 to perform the alignment procedures described above (adjustment of the spacing of the finishing tools, alignment of the pressing bowls).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A finishing device for finish machining a workpiece, the device comprising:
   a first workpiece holder;
   a rotary drive configured to rotate the workpiece about a workpiece axis;
   a first finishing tool configured to machine a main bearing concentric to the workpiece axis;
   a second finishing tool configured to machine an additional bearing;
   a second workpiece holder arranged in an additional area outside a working area, the additional area being a portion of an interior of the finishing device that is adjacent to the working area in a direction of a transport axis,
   wherein the finishing tools can be moved along the transport axis which extends via the working area defined by the first workpiece holder so that the finishing tools can be moved into the additional area.

2. The device of claim 1, wherein the second workpiece holder is structurally identical to the first workpiece holder with respect to its workpiece holding surfaces interacting with a workpiece.

3. The device of claim 1, wherein the second workpiece holder includes a second headstock and a second tailstock.

4. The device of claim 3, wherein a first headstock and a first tailstock of the first workpiece holder of the working area are aligned relative to one another, and wherein the second headstock and the second tailstock of the second workpiece holder are or can be aligned in an identical manner relative to one another.

5. The device of claim 3, wherein rotational axes of the second headstock and of the second tailstock deviate from having an alignment of rotation that is perfectly concentric and parallel to one another and have a same offset and a same tilt relative to one another as rotational axes of the first headstock and of the first tailstock.

6. The device of claim 3, wherein a position of the second headstock and/or the second tailstock can be adjusted along adjusting axes that are perpendicular to one another.

7. The device of claim 3, wherein the second headstock does not have any rotary drive.

8. The device of claim 1, wherein the finishing tools are held on a finishing tool holder, which is driven in a movable manner along the transport axis.

9. The device of claim 1, wherein the working area includes a workpiece transport system.

10. The device of claim 1, wherein the working area includes a spray protection device.

11. The device of claim 1, wherein the finishing tools include a finishing tape.

12. A method for setting up the device of claim 1, the method comprising:
  detecting a positional and locational error assigned to the first workpiece holder of the working area; and
  positioning and/or aligning the second workpiece holder or parts thereof such that a positional and locational error assigned to the second workpiece holder is identical to the positional and locational error of the first workpiece holder.

13. The device of claim 1, configured to finish machining a crankshaft or a camshaft.

14. The device of claim 1, wherein the finishing tools are retained in a movable manner on a carriage, which is configured to move along a carriage guide in the transport axis between the working area and the additional area.

15. A method for operating a finishing device for finish machining a workpiece, the method comprising:
  providing a first workpiece holder;
  providing a rotary drive configured to rotate the workpiece about a workpiece axis;
  providing a first finishing tool configured to machine a main bearing concentric to the workpiece axis;
  providing a second finishing tool configured to machine an additional bearing;
  providing a second workpiece holder arranged in an additional area outside a working area, the additional area being a portion of an interior of the finishing device that is adjacent to the working area in a direction of a transport axis;
  wherein the finishing tools can be moved along a the transport axis which extends via the working area defined by the first workpiece holder so that the finishing tools can be moved into the additional area;
  moving the finishing tools into the additional area;
  aligning the finishing tools in the additional area, optionally using a setup workpiece; subsequently,
  moving the finishing tools in their aligned state into the working area and are used there for finish machining a workpiece.

* * * * *